US012793426B2

(12) United States Patent
Wang et al.

(10) Patent No.: US 12,793,426 B2
(45) Date of Patent: Nov. 10, 2026

(54) DETECTION METHOD, ELECTRONIC DEVICE AND STORAGE MEDIUM

(71) Applicants: ZHEJIANG HENGYI PETROCHEMICAL CO., LTD., Zhejiang (CN); JIAXING YIPENG CHEMICAL FIBER CO., LTD., Jiaxing City (CN)

(72) Inventors: Peng Wang, Zhejiang (CN); Xiantao Peng, Zhejiang (CN); Yibo Qiu, Zhejiang (CN); Jiangang Chen, Zhejiang (CN); Dake Li, Zhejiang (CN); Junliang Jin, Zhejiang (CN); Rongwei Kong, Zhejiang (CN); Yaobin Zhang, Zhejiang (CN)

(73) Assignees: Zhejiang Hengyi Petrochemical Co., Ltd., Zhejiang (CN); Jiaxing Yipeng Chemical Fiber Co., Ltd., Jiaxing City (CN)

( * ) Notice: Subject to any disclaimer, the term of this patent is extended or adjusted under 35 U.S.C. 154(b) by 130 days.

(21) Appl. No.: 19/062,930

(22) Filed: Feb. 25, 2025

(65) Prior Publication Data

US 2026/0004587 A1 Jan. 1, 2026

(30) Foreign Application Priority Data

Jun. 27, 2024 (CN) ........................ 202410853956.X

(51) Int. Cl.
*G06T 7/73* (2017.01)
*G06V 10/26* (2022.01)
(Continued)

(52) U.S. Cl.
CPC ................ *G06V 20/52* (2022.01); *G06T 7/73* (2017.01); *G06V 10/26* (2022.01); *G06V 10/761* (2022.01);
(Continued)

(58) Field of Classification Search
None
See application file for complete search history.

(56) References Cited

U.S. PATENT DOCUMENTS

| | | | | |
|---|---|---|---|---|
| 7,346,187 | B2 | 3/2008 | Buehler | |
| 11,993,868 | B1 * | 5/2024 | Peng | D01H 13/26 |
| 2026/0004544 | A1 * | 1/2026 | Peng | G06V 10/25 |

FOREIGN PATENT DOCUMENTS

| | | | | |
|---|---|---|---|---|
| CN | 110950181 A | * | 4/2020 | B65H 63/00 |
| CN | 115601665 A | | 1/2023 | |

(Continued)

OTHER PUBLICATIONS

European Search Report dated Jun. 20, 2025 in European Patent Application No. 25156263.3.

(Continued)

*Primary Examiner* — Bernard Krasnic

(74) *Attorney, Agent, or Firm* — Perilla Knox & Hildebrandt LLP

(57) ABSTRACT

Provided is a detection method, an electronic device and a storage medium. The method includes: obtaining an entering image and a leaving image when detecting that a trolley leaves an area; where the entering image is obtained by performing image acquisition on the trolley after the trolley enters the area, and the leaving image is obtained by performing image acquisition on the trolley after the trolley leaves the area; inputting the entering image into a target detection model to obtain a first quantity of yarn spindles contained in the entering image, and inputting the leaving image into the target detection model to obtain a second quantity of yarn spindles contained in the leaving image; and generating detection information for the trolley based on the first quantity of yarn spindles contained in the entering image and the second quantity of yarn spindles contained in the leaving image.

17 Claims, 14 Drawing Sheets

(51) Int. Cl.
*G06V 10/74* (2022.01)
*G06V 20/52* (2022.01)

(52) U.S. Cl.
CPC ............... *G06T 2207/20021* (2013.01); *G06T 2207/20072* (2013.01); *G06T 2207/30124* (2013.01); *G06T 2207/30242* (2013.01); *G06V 2201/07* (2022.01)

(56) References Cited

FOREIGN PATENT DOCUMENTS

| | | | | | |
|---|---|---|---|---|---|
| JP | 1995292529 | A | | 11/1995 | |
| WO | WO-2021246139 | A1 | * | 12/2021 | ............. D04B 15/99 |

OTHER PUBLICATIONS

Japanese Notice of Rejection dated Jul. 22, 2025 in Japanese Patent Application No. 2025-107208.

* cited by examiner

DETECTION METHOD, ELECTRONIC DEVICE AND STORAGE MEDIUM

CROSS-REFERENCE TO RELATED APPLICATIONS

The present application claims priority to Chinese Patent Application No. CN202410853956.X, filed with the China National Intellectual Property Administration on Jun. 27, 2024, the disclosure of which is hereby incorporated herein by reference in its entirety.

TECHNICAL FIELD

The present disclosure relates to a field of data processing technology, and in particular to a detection method and apparatus, an electronic device and a storage medium.

BACKGROUND

In the manufacturing industry of yarn spindles, before packaging, the produced yarn spindles are usually transported by a trolley to a designated area (such as a warehouse) for storage. After a certain period of storage, the trolley carrying the yarn spindles is transported away from the designated area for subsequent processes such as packaging. During the storage period, it is necessary to ensure that the yarn spindles on the trolley have not been moved away to avoid affecting a subsequent packaging process. Therefore, when the trolley carrying the yarn spindles leaves the designated area, manual sampling detection will be performed on the trolley that leaves. Obviously, the manual sampling detection method is inefficient and has a high missed detection rate.

SUMMARY

The present disclosure provides a detection method and apparatus, a device and a storage medium, to solve or alleviate one or more technical problems in the related art.

In a first aspect, the present disclosure provides a detection method, applied to cloud, including:

- obtaining a first entering image and a first leaving image when detecting that a target trolley leaves a target area; where the first entering image is obtained by performing image acquisition on the target trolley after the target trolley enters the target area, the first leaving image is obtained by performing image acquisition on the target trolley after the target trolley leaves the target area, and both the first entering image and the first leaving image contain all yarn spindles carried by the target trolley;
- inputting the first entering image into a first target detection model to obtain a first quantity of yarn spindles contained in the first entering image, and inputting the first leaving image into the first target detection model to obtain a second quantity of yarn spindles contained in the first leaving image; where the first target detection model is used to identify yarn spindles in an input image based on a preset yarn spindle prompt word, and estimate an actual quantity of yarn spindles in the input image based on an identification result; and
- generating detection information for the target trolley based on the first quantity of yarn spindles contained in the first entering image and the second quantity of yarn spindles contained in the first leaving image.

In a second aspect, the present disclosure provides a detection apparatus, applied to cloud, including:

- an information obtaining unit configured to obtain a first entering image and a first leaving image when detecting that a target trolley leaves a target area; where the first entering image is obtained by performing image acquisition on the target trolley after the target trolley enters the target area, the first leaving image is obtained by performing image acquisition on the target trolley after the target trolley leaves the target area, and both the first entering image and the first leaving image contain all yarn spindles carried by the target trolley; and
- a detection unit configured to input the first entering image into a first target detection model to obtain a first quantity of yarn spindles contained in the first entering image, and input the first leaving image into the first target detection model to obtain a second quantity of yarn spindles contained in the first leaving image; where the first target detection model is used to identify yarn spindles in an input image based on a preset yarn spindle prompt word, and estimate an actual quantity of yarn spindles in the input image based on an identification result; and generate detection information for the target trolley based on the first quantity of yarn spindles contained in the first entering image and the second quantity of yarn spindles contained in the first leaving image.

In a third aspect, provided is an electronic device, including:

- at least one processor; and
- a memory connected in communication with the at least one processor;
- where the memory stores an instruction executable by the at least one processor, and the instruction, when executed by the at least one processor, enables the at least one processor to execute the method of any embodiment of the present disclosure.

In a fourth aspect, provided is a non-transitory computer-readable storage medium storing a computer instruction thereon, and the computer instruction is used to cause a computer to execute the method of any embodiment of the present disclosure.

In a fifth aspect, provided is a computer program product including a computer program, and the computer program implements the method of any embodiment of the present disclosure, when executed by a processor.

In this way, the solution of the present disclosure can use the first target detection model to count the yarn spindles contained in the first entering image and the first leaving image obtained, to obtain the actual quantity (such as the first quantity and the second quantity) of yarn spindles contained in each image, and quickly obtain the detection information of the target trolley based on the actual quantity of yarn spindles contained in each image. Thus, compared with the existing manual sampling detection method, the solution of the present disclosure can quickly complete the detection of the yarn spindles in the target trolley without relying on manual work, thereby realizing the automation and intelligence of the entire process, and greatly improving the detection efficiency of the trolley entering and leaving the target area.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

FIG. 2(*c*) is a schematic diagram of an entering image corresponding to a carrying area on one side of the target trolley according to an embodiment of the present application;

FIG. 2(*d*) is a schematic diagram of an image obtained by processing the image shown in FIG. 2(*c*) using a mask plate according to an embodiment of the present application;

FIG. 2(*e*) is a schematic diagram of an leaving image corresponding to a carrying area on one side (the same side as in FIG. 2(*c*)) of the target trolley according to an embodiment of the present application;

FIG. 2(*f*) is a schematic diagram of an image obtained by processing the image shown in FIG. 2(*e*) using a mask plate according to an embodiment of the present application;

FIG. 4(*b*) is a schematic diagram of segmenting a dot prompt image according to an embodiment of the present application;

FIG. 5(*b*) is a schematic flowchart of obtaining a target entering mask image with identification information according to an embodiment of the present application;

FIG. 5(*c*) is a schematic flowchart of obtaining a target leaving mask image with identification information according to an embodiment of the present application;

FIG. 6(*b*) is a schematic diagram of a priori feature layer included in the second target detection model according to an embodiment of the present application;

FIG. 6(*c*) is a schematic diagram of a similarity graph priori layer included in a semantic priori layer according to an embodiment of the present application;

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

The solution of the present disclosure proposes a detection method to reduce the missing detection rate of yarn spindles.

Figure 1:
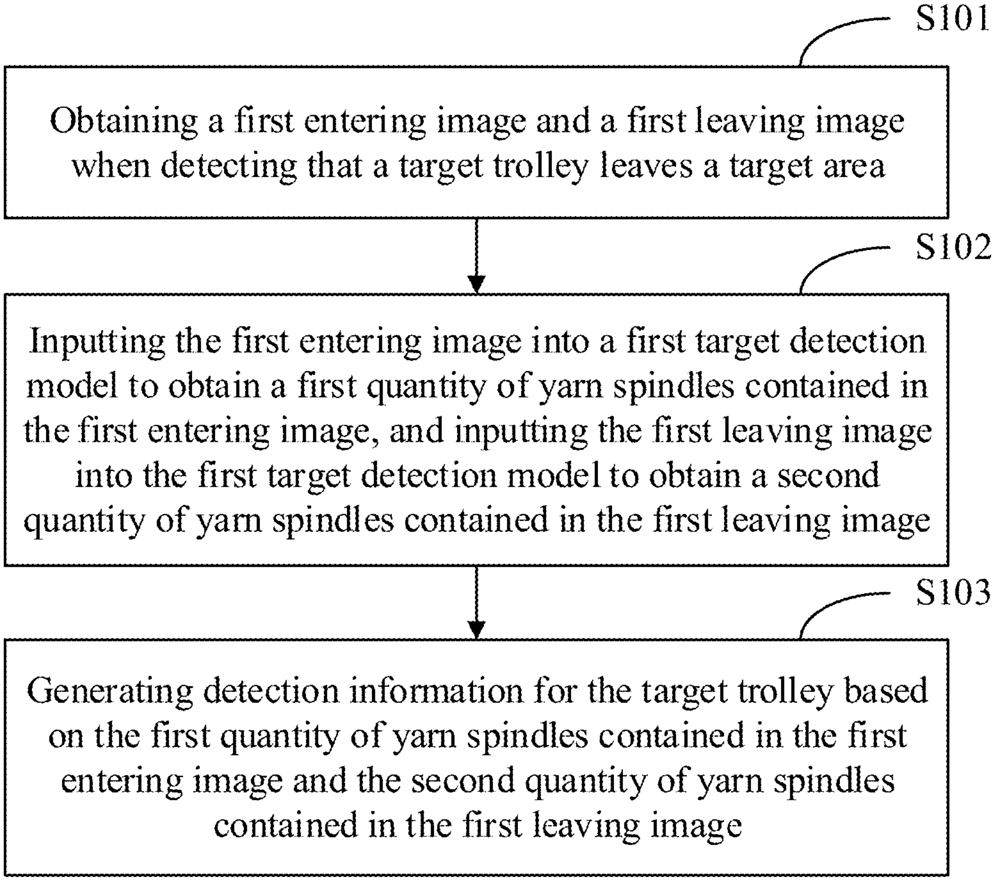
FIG. 1 is a first schematic flowchart of a detection method according to an embodiment of the present application.
Figure 2A:
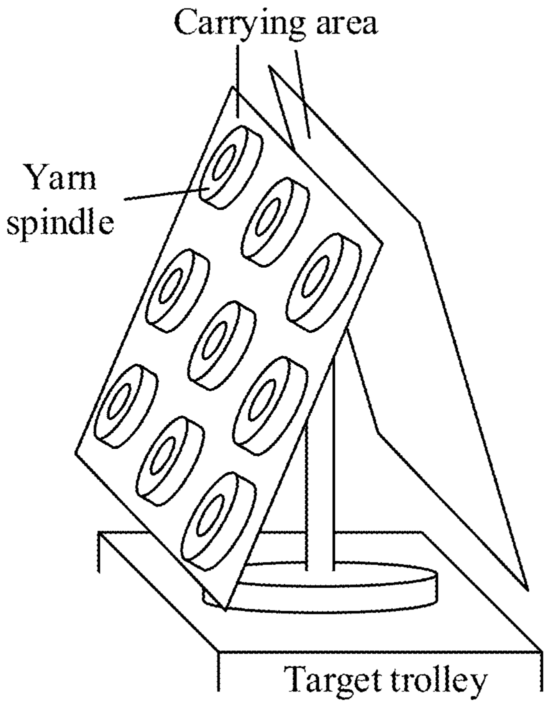
FIG. 2(*a*) and FIG. 2(*b*) are schematic diagrams of the target trolley according to an embodiment of the present application.
Figure 2B:
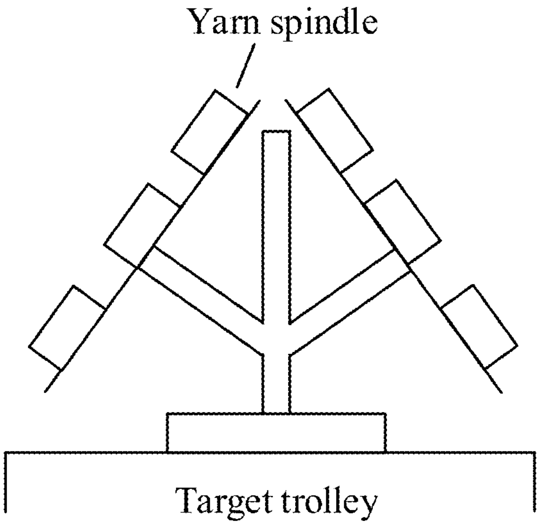
Figure 2C:
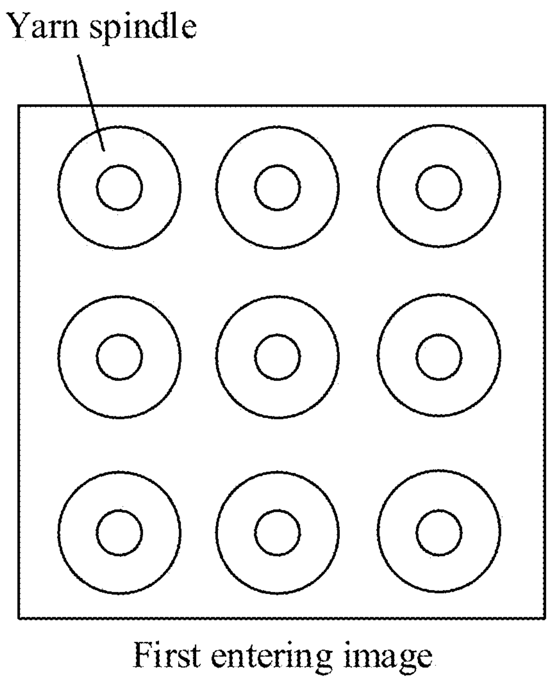
Figure 2D:
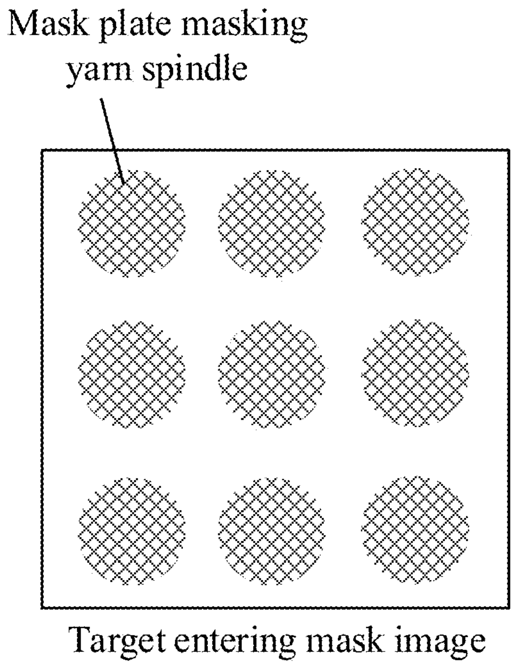
Figure 2E:
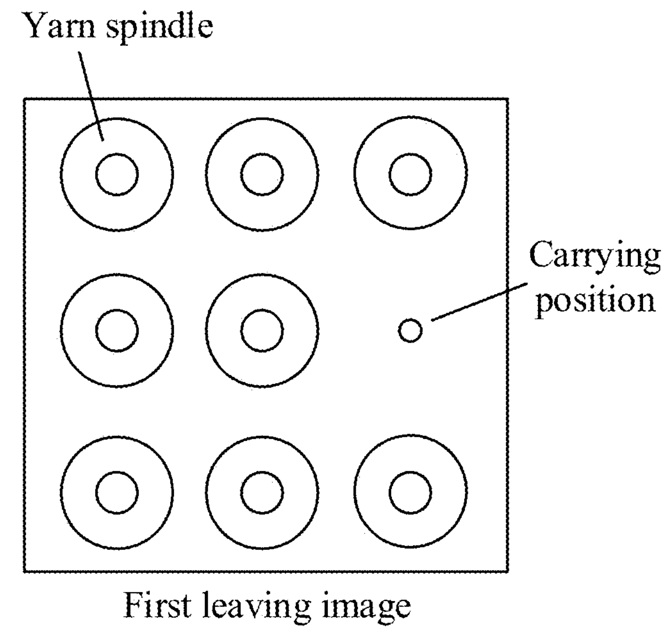
Figure 2F:
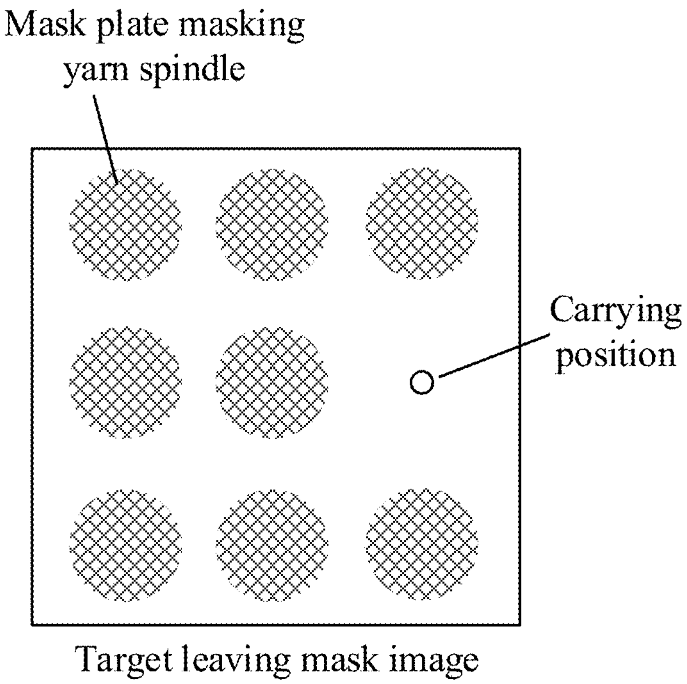

Specifically, FIG. 1 is a first schematic flowchart of a detection method according to an embodiment of the present application. The method is optionally applied in electronic devices, such as personal computers, servers, server clusters and other electronic devices.

Further, the method includes at least a part of the following content. As shown in FIG. 1, the method includes:

Step S101: obtaining a first entering image and a first leaving image when detecting that a target trolley leaves a target area.

Here, the first entering image is obtained by performing image acquisition on the target trolley after the target trolley enters the target area, and the first leaving image is obtained by performing image acquisition on the target trolley after the target trolley leaves the target area. Further, both the first entering image and the first leaving image contain all yarn spindles carried by the target trolley.

In an example, as shown in FIG. 2(*a*) and FIG. 2(*b*), carrying areas for carrying several yarn spindles are provided on both sides of the target trolley; at this time, after the target trolley enters the target area, image acquisition may be performed on the carrying areas on both sides of the target trolley to obtain an entering image corresponding to each side, where the entering image corresponding to each side includes all yarn spindles carried in the carrying area on this side; and further, the images of the carrying areas on both sides may be spliced to obtain the first entering image containing all the yarn spindles carried by the target trolley.

Correspondingly, in another example, after the target trolley leaves the target area, the image acquisition is also performed respectively on the carrying areas on both sides of the target trolley to obtain a leaving image corresponding to each side again; and further, the leaving images of the carrying areas on both sides at this time are spliced to obtain the first leaving image containing all the yarn spindles carried by the target trolley.

It should be noted that the splicing rules of the first leaving image and the first entering image are similar, so as to facilitate the subsequent comparison of them to obtain the detection information of the target trolley.

Further, it can be understood that splicing may not be performed after the image on each side is obtained, the entering image on the same side is directly used as the first entering image, and the leaving image on the same side is directly used as the first leaving image. Then the entering image and the leaving image on the same side are compared, and the detection information for the target trolley is obtained after comparisons on both sides are completed.

In an example, the target area may specifically be a placement area in a production workshop of yarn spindles, or an area where a warehouse for temporarily storing the target trolley is located, which is not specifically limited in the solution of the present disclosure.

Step S102: inputting the first entering image into a first target detection model to obtain a first quantity of yarn spindles contained in the first entering image, and inputting the first leaving image into the first target detection model to obtain a second quantity of yarn spindles contained in the first leaving image.

Here, the first target detection model is used to identify yarn spindles in an input image based on a preset yarn spindle prompt word, and estimate an actual quantity of yarn spindles in the input image based on an identification result. Here, the input image is the first entering image or the first leaving image.

Step S103: generating detection information for the target trolley based on the first quantity of yarn spindles contained in the first entering image and the second quantity of yarn spindles contained in the first leaving image.

In this way, the solution of the present disclosure can use the first target detection model to count the yarn spindles contained in the first entering image and the first leaving image obtained, to obtain the actual quantity (such as the first quantity and the second quantity) of yarn spindles contained in each image, and quickly obtain the detection information of the target trolley based on the actual quantity of yarn spindles contained in each image. Thus, compared with the existing manual sampling detection method, the solution of the present disclosure can quickly complete the detection of the yarn spindles in the target trolley without relying on manual work, thereby realizing the automation and intelligence of the entire process, and greatly improving the detection efficiency of the trolley entering and leaving the target area.

Further, in a specific example, the detection information for the target trolley may be obtained in the following manner; specifically, the above step of generating detection information for the target trolley based on the first quantity of yarn spindles contained in the first entering image and the second quantity of yarn spindles contained in the first leaving image (for example, the above step S103) specifically includes:

Step S103-1: judging whether the first quantity of yarn spindles contained in the first entering image is the same as the second quantity of yarn spindles contained in the first leaving image. If so, proceed to step S103-2; otherwise, proceed to step S103-3.

That is, it is judged whether the quantity of yarn spindles in the target trolley changes when entering and leaving the target area, and then the detection information of the target trolley is quickly obtained based on the difference.

Step S103-2: obtaining the detection information that the target trolley passes the detection when the first quantity of yarn spindles contained in the first entering image is the same as the second quantity of yarn spindles contained in the first leaving image.

It should be noted that, for the target trolley with carrying areas carrying yarn spindles on both sides, the detection information that the target trolley passes the detection can be generated only when determining that the detection has passed on both sides.

Step S103-3: obtaining a target entering mask image of the first entering image and a target leaving mask image of the first leaving image when the first quantity of yarn spindles contained in the first entering image is different from the second quantity of yarn spindles contained in the first leaving image. And proceed to step S103-4.

Here, the target entering mask image is at least an image obtained by using a mask plate to mask an area where each yarn spindle is located in the first entering image. Further, the quantity of mask plates in the target entering mask image of the first entering image is related to the quantity of yarn spindles in the first entering image, and further, is also related to the quantity of yarn spindles in the target trolley. For example, in an example, the quantity of mask plates in the target entering mask image of the first entering image, the quantity of yarn spindles in the first entering image, and the quantity of yarn spindles in the target trolley are the same.

Correspondingly, the target leaving mask image is at least an image obtained by using a mask plate to mask an area where each yarn spindle is located in the first leaving image. Further, the quantity of mask plates in the target leaving mask image of the first leaving image is related to the quantity of yarn spindles in the first leaving image, and further, is also related to the quantity of yarn spindles in the target trolley. For example, in an example, the quantity of mask plates in the target leaving mask image of the first leaving image, the quantity of yarn spindles in the first leaving image, and the quantity of yarn spindles in the target trolley are the same.

Step S103-4: generating the detection information that the target trolley fails the detection based on the difference information between the target entering mask image and the target leaving mask image.

Here, in the example, after the detection information that the target trolley fails the detection is generated, the prompt information may also be generated to prompt the worker to perform further inspection.

Further, in the example, the difference information can characterize the difference in the mask plates between the target entering mask image and the target leaving mask image, and further characterize the difference in the yarn spindles between the target entering mask image and the target leaving mask image. In other words, the difference information between the target entering mask image and the target leaving mask image can characterize the difference in the yarn spindles in the target trolley when entering and leaving the target area.

For example, FIG. 2(*c*) is a schematic diagram of a first entering image obtained after image acquisition of a carrying area on one side of the target trolley. The first entering image contains 9 yarn spindles. At this time, a target entering mask image as shown in FIG. 2(*d*) is obtained after using a mask plate to mask the area where each yarn spindle is located in the first entering image. Correspondingly, FIG. 2(*e*) is a schematic diagram of a first leaving image obtained after image acquisition of the carrying area on one side (the same side as in FIG. 2(*c*)) of the target trolley. The first leaving image contains 8 yarn spindles. At this time, a target leaving mask image as shown in FIG. 2(*f*) is obtained after using a mask plate to mask the area where each yarn spindle is located in the first leaving image.

It should be pointed out that one yarn spindle is missing in the first leaving image shown in FIG. 2(*e*). At this time, the area where the yarn spindle is missing will not be identified as an area to be masked. In other words, the carrying position where the yarn spindle is missing will not be masked, thus providing strong support for subsequent detection.

Further, for the scenarios of FIG. 2(*e*) and FIG. 2(*f*), the detection information that the target trolley fails the detection may be obtained based on the difference in the mask plates between the target entering mask image and the target leaving mask image. Here, the detection information that the target trolley fails the detection may further carry specific information of the missing yarn spindle, such as the identification information or carrying position or other information of the yarn spindle, thus facilitating further manual inspection of the target trolley.

In a specific example, the image acquisition may be performed in the following manner; specifically, before the above step of obtaining a first entering image and a first leaving image when detecting that a target trolley leaves a target area (for example, before the above step S101), the detection method further includes:

In the first manner: when detecting that the target trolley enters the start position of the target area, starting an image acquisition device located at the start position of the target area to perform image acquisition on the area carrying yarn spindles in the target trolley.

In the second manner: when detecting that the target trolley leaves the target area, starting an image acquisition device located at the end position of the target area to perform image acquisition on the area carrying yarn spindles in the target trolley.

In the third manner: when detecting that the target trolley enters the start position of the target area, starting an image acquisition device located at the start position of the target area to perform image acquisition on the area carrying yarn spindles in the target trolley; and, when detecting that the target trolley leaves the target area, starting an image acquisition device located at the end position of the target area to perform image acquisition on the area carrying yarn spindles in the target trolley.

Here, the image acquisition device (such as image acquisition device 1 or image acquisition device 2) in the example may specifically include a camera. For example, the first entering image is obtained by using the camera to perform image acquisition on the carrying area of yarn spindles in the target trolley that is entering the target area. For example, the camera is used to photograph the carrying area of yarn spindles in the target trolley to obtain the first entering image, or perform video acquisition on the carrying area of yarn spindles in the target trolley that is entering the target area for a preset duration to obtain a plurality of continuous video frames, and select an image from the continuous video frames as the first entering image. Correspondingly, the manners for obtaining the first leaving image are similar to the above manners, and will not be described in detail here.

Figure 3:
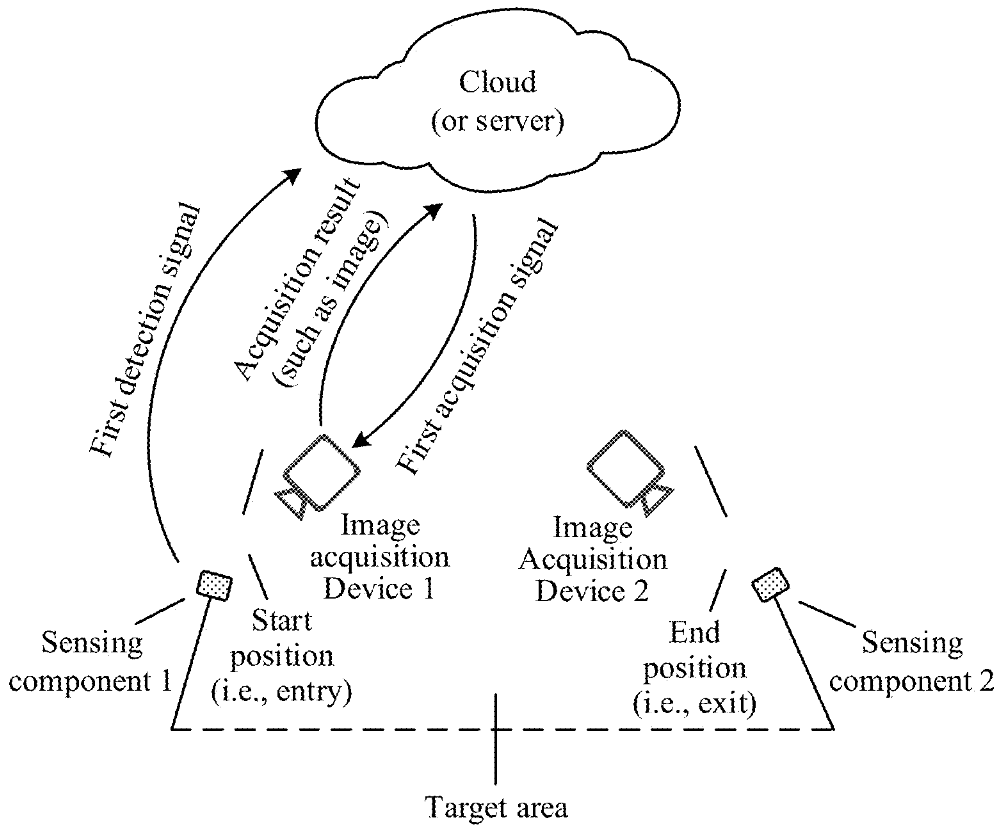
FIG. 3 is a schematic diagram of an application scenario of the detection method in an example according to an embodiment of the present application.

For example, as shown in FIG. 3, a sensing component 1 and an image acquisition device 1 are provided at the start position (such as entry) of the target area, where the sensing component 1 is configured to detect whether the target trolley reaches the start position, and the image acquisition device 1 is configured to perform image acquisition on the carrying area of yarn spindles in the target trolley reaching the start position; and similarly, a sensing component 2 and an image acquisition device 2 are provided at the end position (such as exit) of the target area, where the sensing component 2 is configured to detect whether the target trolley leaves the target area, and the image acquisition device 2 is configured to perform image acquisition on the carrying area of yarn spindles in the target trolley that is leaving the target area. For example, in an example, firstly the sensing component 1 sends a first detection signal to the cloud (or server) when detecting that the target trolley reaches the start position of the target area; secondly, the cloud generates and sends a first acquisition signal to the image acquisition device 1 in response to the first detection signal, so that the image acquisition device 1 performs image acquisition on the carrying area of yarn spindles in the target trolley; and finally, after receiving the entering image captured by the image acquisition device 1, the cloud detects the entering image to obtain the first quantity of yarn spindles contained in the entering image. Correspondingly, the cloud may obtain the second quantity of yarn spindles contained in the leaving image; and at this time, the cloud may obtain the detection information of the target trolley entering and leaving the target area according to the obtained first quantity and second quantity.

In this way, the solution of the present disclosure can timely obtain relevant images of the carrying area of yarn spindles in the target trolley when the target trolley reaches the specified position (such as the entry or exit of the target area), thus laying a foundation for subsequently obtaining the detection information of the target trolley rapidly based on image detection.

In a specific example, the first target detection model may be an untrained counting model based on a Segment Anything Model (SAM) or may be other segmentation model with target counting capability, which is not limited in the solution of the present disclosure.

Figure 4A:
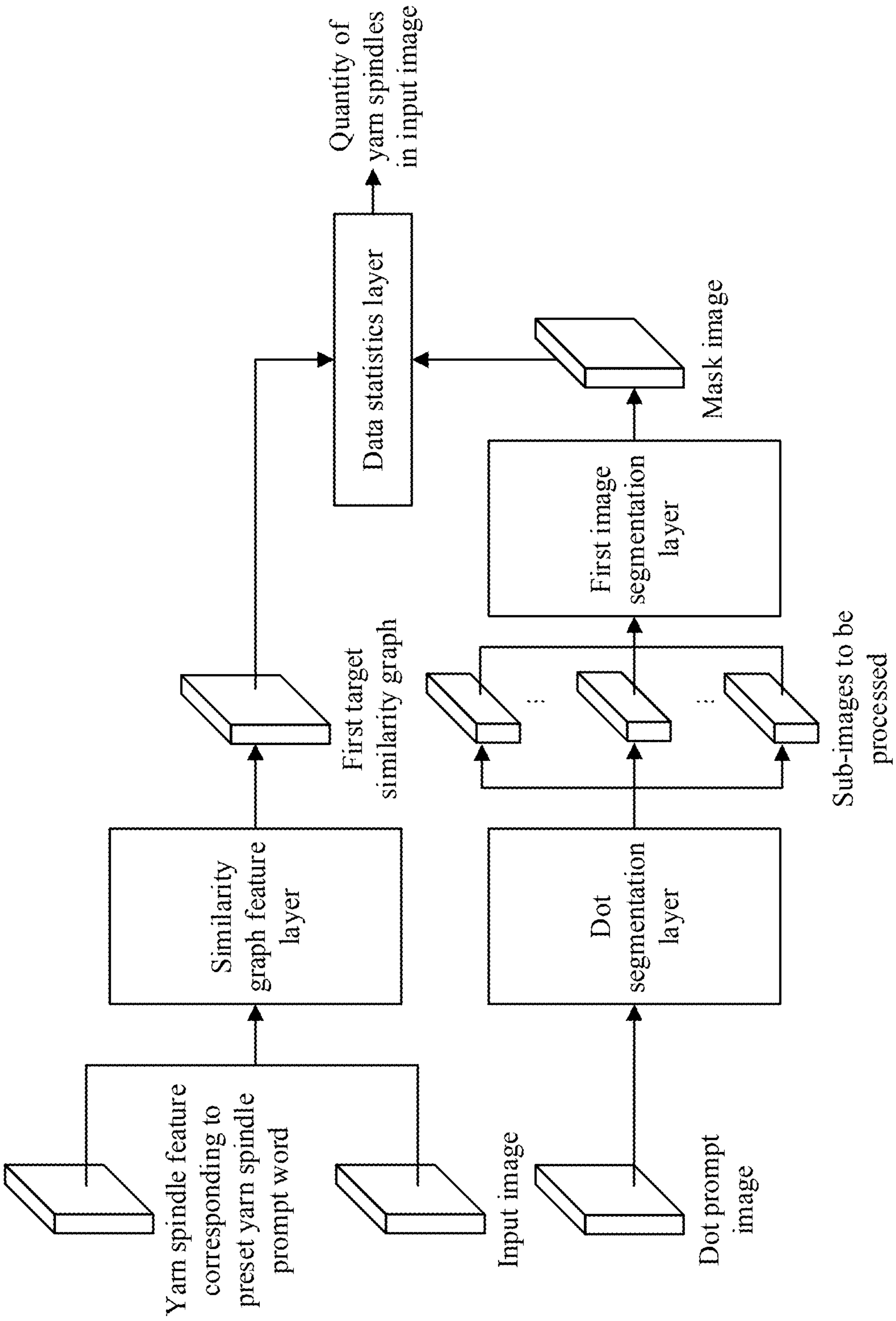
FIG. 4(*a*) is a schematic diagram of a model structure of a first target detection model according to an embodiment of the present application.
Figure 4B:
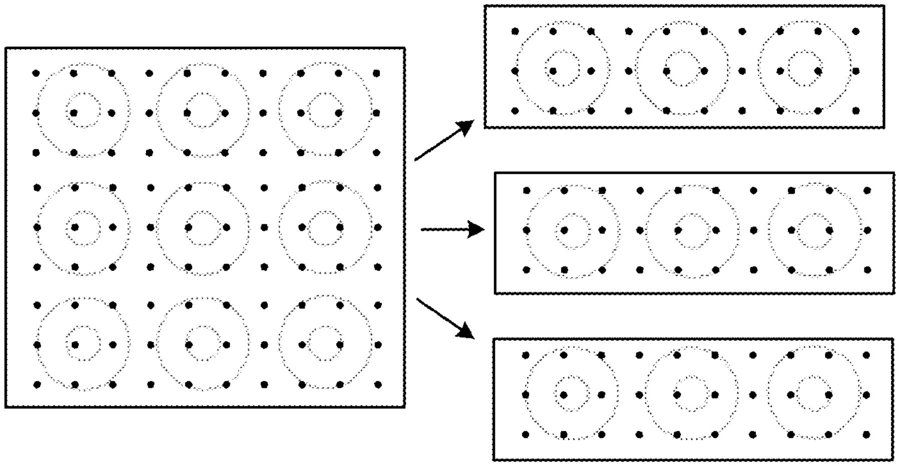

Further, in an example, as shown in FIG. 4(*a*), the first target detection model includes at least a similarity graph feature layer, a dot segmentation layer, a first image segmentation layer and a data statistics layer.

Specifically, in an example, the similarity graph feature layer is configured to estimate a position of each yarn spindle in the input image based on a similarity between a yarn spindle feature corresponding to the preset yarn spindle prompt word and an image feature of the input image, to obtain a first target similarity graph, thus laying a foundation for subsequently counting the yarn spindles contained in the input image.

Further, in another example, the dot segmentation layer is configured to segment a dot prompt image to obtain a plurality of sub-images to be processed indicating positions of dots; where positions of dots in different sub-images to be processed among the plurality of sub-images to be processed do not overlap. Here, the dot prompt image is obtained by processing the input image using dots. For example, as shown in FIG. 4(*b*), firstly the input image such as the first entering image shown in FIG. 2(*c*) is processed using dots to obtain a dot prompt image corresponding to the first entering image; and secondly, the obtained dot prompt image is segmented, for example, by row, to obtain a plurality of sub-images to be processed, and the dots between the sub-images to be processed do not overlap with each other, so as to facilitate batch image processing of the sub-images to be processed while effectively avoiding repeated identification, thereby laying a foundation for further improving the identification efficiency.

Further, in yet another example, the first image segmentation layer is configured to identify yarn spindles in each sub-image to be processed based on the preset yarn spindle prompt word, and use a mask plate to mask an area where each yarn spindle is located in the sub-image to be processed to obtain a sub-mask image of each sub-image to be processed; and further, obtain a mask image of the input image based on the sub-mask image of each sub-image to be processed, for example, by splicing the sub-mask images of the sub-images to be processed, after obtaining the sub-mask image of each sub-image to be processed.

Further, in yet another example, the data statistics layer is configured to estimate the actual quantity of yarn spindles in the input image based on the first target similarity graph and the mask image of the input image.

Further, in a specific example, the data statistics layer is specifically configured to calculate a similarity between an image feature corresponding to a mask area in the mask image of the input image and an image feature at an area in the first target similarity graph corresponding to the mask area to obtain a similarity corresponding to the mask area, where the mask area is an area where the mask plate is located in the mask image of the input image; and then estimate the actual quantity of yarn spindles in the input image based on the similarity corresponding to the mask area. For example, the mask areas with similarity greater than a preset threshold (such as 0.8) are counted, and the actual quantity of mask areas with similarity greater than the preset threshold is used as the actual quantity of yarn spindles in the input image, thus quickly estimating the actual quantity of yarn spindles in the input image, and providing strong support for automatically and intelligently obtaining the detection information of the target trolley.

Further, in an example, a feature enhancement layer may be added after the similarity graph feature layer. For example, the first target similarity graph obtained using the similarity graph feature layer is input into the feature enhancement layer to perform feature enhancement on the first target similarity graph, to obtain the first target similarity graph after feature enhancement. At this time, the data statistics layer may specifically count based on the first target similarity graph after feature enhancement and the mask image of the input image, thus further improving the accuracy of the quantity of yarn spindles in the image.

In this way, the solution of the present disclosure provides a model that can count the yarn spindles contained in the input image. The model can efficiently perform technical statistics, thereby providing strong support for automatically and intelligently obtaining the detection information of the target trolley, and also providing strong support for improving the detection efficiency.

Figure 5A:
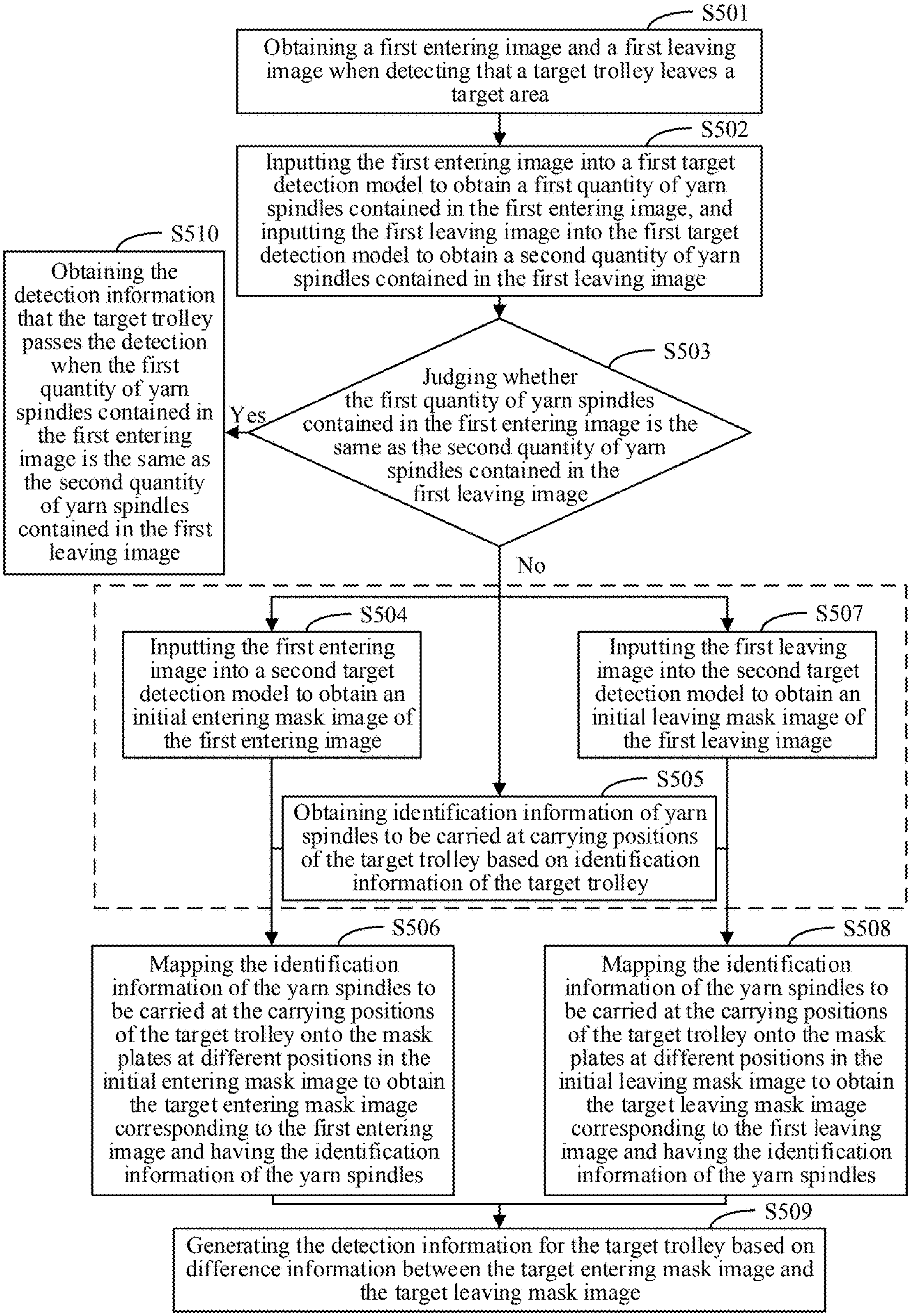
FIG. 5(*a*) is a second schematic flowchart of a detection method according to an embodiment of the present application.
Figure 5B:
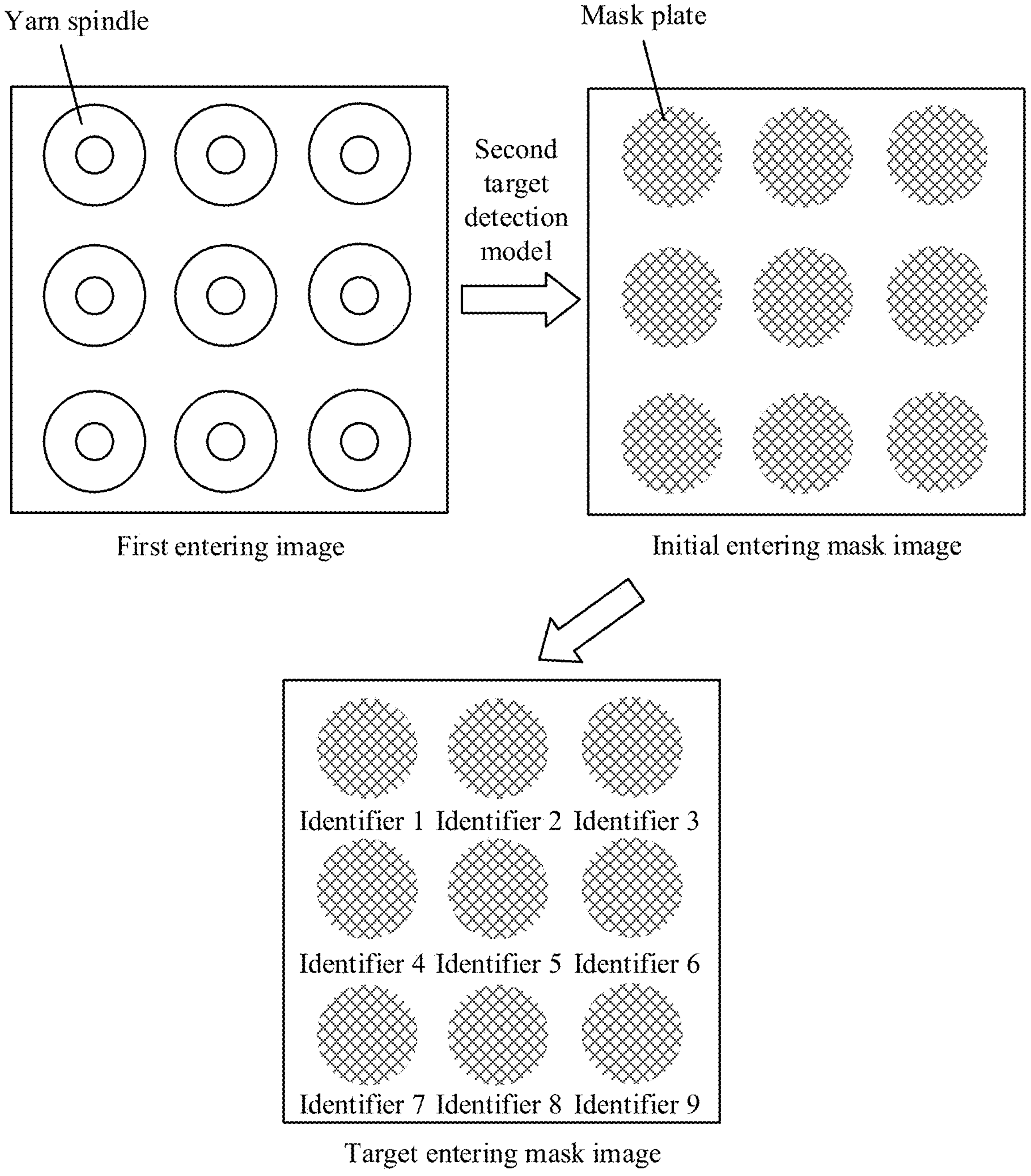
Figure 5C:
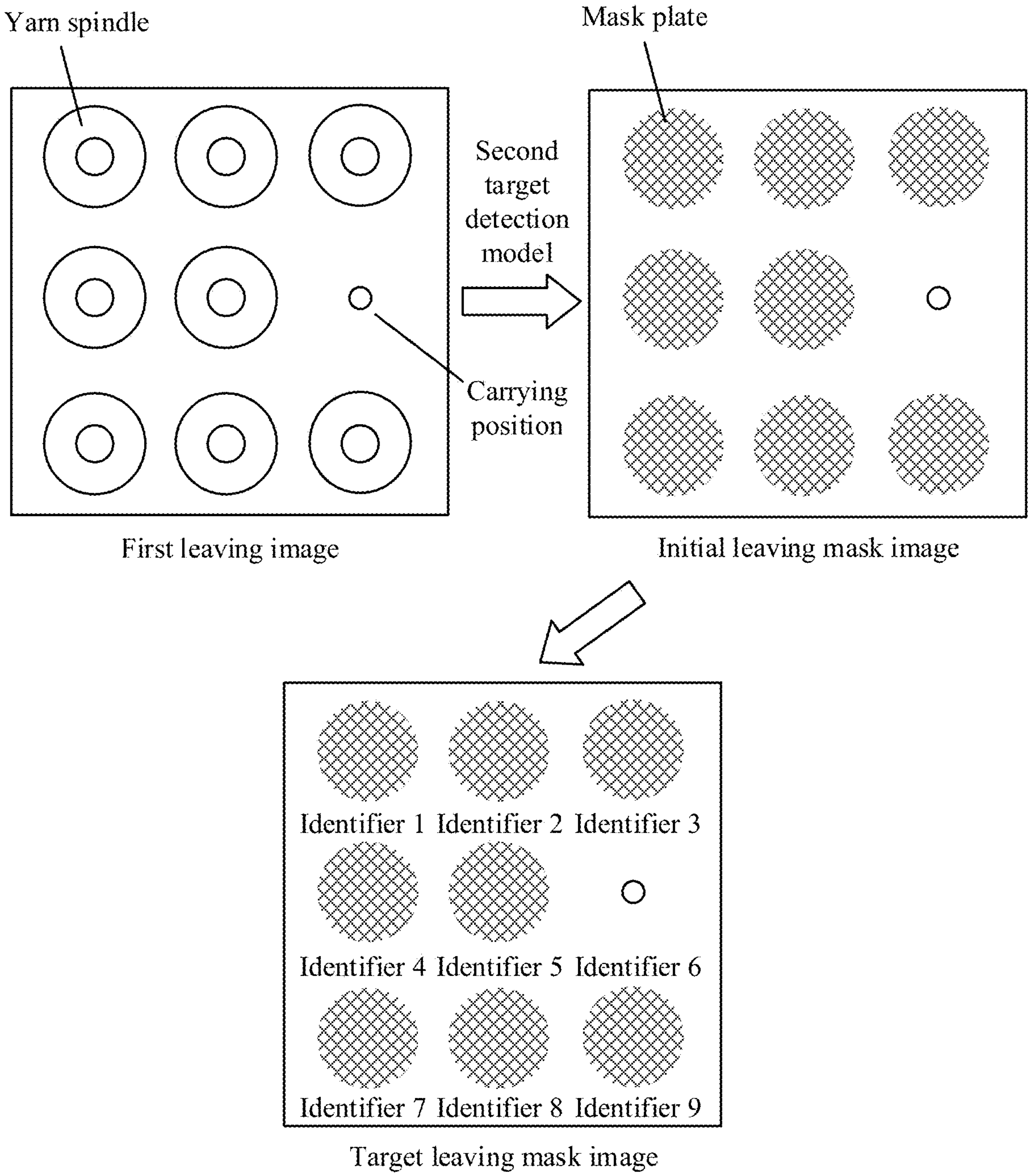

FIG. 5(*a*) is a second schematic flowchart of a detection method according to an embodiment of the present application. The method may be optionally applied in electronic devices, such as personal computers, servers, server clusters and other electronic devices. It can be understood that the relevant content of the methods shown in FIG. 1 to FIG. 4 described above may also be applied to the example, and the relevant content will not be repeated in the example.

Further, the method includes at least a part of the following content. As shown in FIG. 5(*a*), the method includes:

Step S501: obtaining a first entering image and a first leaving image when detecting that a target trolley leaves a target area.

Here, the first entering image is obtained by performing image acquisition on the target trolley after the target trolley enters the target area, the first leaving image is obtained by performing image acquisition on the target trolley after the target trolley leaves the target area, and both the first entering image and the first leaving image contain all yarn spindles carried by the target trolley.

Step S502: inputting the first entering image into a first target detection model to obtain a first quantity of yarn spindles contained in the first entering image, and inputting the first leaving image into the first target detection model to obtain a second quantity of yarn spindles contained in the first leaving image.

Here, the first target detection model is used to identify yarn spindles in an input image based on a preset yarn spindle prompt word, and estimate an actual quantity of yarn spindles in the input image based on an identification result.

Step S503: judging whether the first quantity of yarn spindles contained in the first entering image is the same as the second quantity of yarn spindles contained in the first leaving image. If so, step S510 is executed; otherwise, that is, when the first quantity of yarn spindles contained in the first entering image is different from the second quantity of yarn spindles contained in the first leaving image, step S504 is executed.

Step S504: inputting the first entering image into a second target detection model to obtain an initial entering mask image of the first entering image.

Here, the second target detection model can identify the area where each yarn spindle is located in the input image based on the preset yarn spindle prompt word, and use a mask plate to mask the area where each yarn spindle is located in the image to obtain a masked image.

Further, in the example, the quantity of mask plates contained in the initial entering mask image of the first entering image is the same as the quantity of yarn spindles actually contained in the first entering image, thus facilitating the subsequent use of the obtained mask image for difference comparison to improve the reliability and accuracy of the detection result of the target trolley.

Step S505: obtaining identification information of yarn spindles to be carried at carrying positions of the target trolley based on identification information of the target trolley.

It should be pointed out that, in the example, the yarn spindles to be carried at carrying positions in the carrying area of the target trolley may refer to yarn spindles placed at the carrying positions according to a preset placement rule (or sequence), i.e., yarn spindles that the carrying positions theoretically need to carry. Based on this, after the identification information of the target trolley is obtained, the identification information of the yarn spindles theoretically carried at the carrying positions on the target trolley can be obtained, thus providing strong support for subsequent rapid detection or rapid identification of specific problems.

Here, it should be noted that the execution order of step S504 and step S505 may be exchanged, and is not limited in the solution of the present disclosure.

Step S506: mapping the identification information of the yarn spindles to be carried at the carrying positions of the target trolley onto the mask plates at different positions in the initial entering mask image to obtain the target entering mask image corresponding to the first entering image and having the identification information of the yarn spindles.

Here, the target entering mask image corresponding to the first entering image and having the identification information of the yarn spindles is able to represent identification information of the yarn spindles actually contained in the first entering image.

Step S507: inputting the first leaving image into the second target detection model to obtain an initial leaving mask image of the first leaving image.

Here, the quantity of mask plates contained in the initial leaving mask image of the first leaving image is the same as the quantity of yarn spindles actually contained in the first leaving image.

Step S508: mapping the identification information of the yarn spindles to be carried at the carrying positions of the target trolley onto the mask plates at different positions in the initial leaving mask image to obtain the target leaving mask image corresponding to the first leaving image and having the identification information of the yarn spindles.

Here, the target leaving mask image corresponding to the first leaving image and having the identification information of the yarn spindles is able to represent identification information of the yarn spindles actually contained in the first leaving image.

It should be noted that the execution steps of obtaining the target leaving mask image and obtaining the target entering mask image in the example may be exchanged or executed simultaneously, and the solution of the present disclosure does not impose any specific limitation on this execution order.

Further, it should be pointed out that the "mapping" mentioned above may refer to adding the identification information of a yarn spindle to the carrying position where the yarn spindle should theoretically be located based on the preset placement rule. Further, since each yarn spindle is masked by a mask plate in the mask image, the "mapping" mentioned above may further refer to adding the identification information of the yarn spindle to the mask plate at the carrying position where the yarn spindle should theoretically be located based on the preset placement rule.

For example, as shown in FIG. 5(*b*), after using the second target detection model to obtain the initial entering mask image using a mask plate to mask the area where each yarn spindle is located in the first entering image, and obtaining the identification information of yarn spindles theoretically carried at carrying positions of the target trolley, the identification information of the yarn spindles is added to the mask plates at the carrying positions where the yarn spindles should theoretically be located in the initial entering mask image based on the preset placement rule, so as to obtain a target entering mask image with the identification information of the yarn spindles.

Further, as shown in FIG. 5(*c*), after using the second target detection model to obtain the initial leaving mask image using a mask plate to mask the area where each yarn spindle is located in the first leaving image, and obtaining the identification information of yarn spindles theoretically carried at carrying positions of the target trolley, the identification information of the yarn spindles is added to the mask plates at the carrying positions where the yarn spindles should theoretically be located in the initial leaving mask image based on the preset placement rule, so as to obtain a target leaving mask image with the identification information of the yarn spindles.

It should be noted that, as shown in FIG. 5(*c*), due to the existence of a missing yarn spindle, there is no mask plate at the carrying position where the missing yarn spindle is located in the initial leaving mask image. At this time, the identification information of the missing yarn spindle can be added to the carrying position where the missing yarn spindle should theoretically be located in the initial leaving mask image, thus providing strong support for subsequent rapid identification of specific problems.

Step S509: generating the detection information for the target trolley based on difference information between the target entering mask image and the target leaving mask image.

Step S510: obtaining the detection information that the target trolley passes the detection when the first quantity of yarn spindles contained in the first entering image is the same as the second quantity of yarn spindles contained in the first leaving image.

In this way, the solution of the present disclosure can use the second target detection model to detect the captured images (such as the first entering image and the first leaving image), and obtain the target entering mask image with the identification information of the yarn spindles and the target leaving mask image with the identification information of the yarn spindles after obtaining the identification information of the yarn spindles theoretically carried at the carrying positions of the target trolley, and then obtain the detection information of the target trolley based on the difference information between the two mask images. The above process can quickly complete the detection without relying on manual work, realizing the automation and intelligence of the entire process, thus greatly improving the inspection efficiency of trolleys entering and leaving the target area, and thereby saving a lot of manpower and time costs.

Further, in a specific example, the detection information of the target trolley may be obtained in the following manner; specifically, the above step of obtaining the detection information of the target trolley based on the difference information between the target entering mask image and the target leaving mask image (for example, the above step S509) specifically includes:

Step S509-1: comparing the target entering mask image corresponding to the first entering image and having the identification information of the yarn spindles with the target leaving mask image corresponding to the first leaving image and having the identification information of the yarn spindles, to determine a missing yarn spindle; and Step S509-2: obtaining the detection information of the target trolley based on a comparison result. For example, the detection information that the target trolley fails the detection is obtained; and further, the detection information that the target trolley fails the detection also carries the identification information of the missing yarn spindle.

In this way, the solution of the present disclosure can quickly obtain the specific information (such as identification information) of the missing yarn spindle in the target trolley based on the comparison result between the target leaving mask image and the target entering mask image. The above process can quickly complete the detection without relying on manual work, and can quickly identify specific problems, realizing the automation and intelligence of the entire process, thus greatly improving the inspection efficiency of trolleys entering and leaving the target area, and thereby saving a lot of manpower and time costs.

Further, in an example, the second target detection model may be specifically a segment anything model based on the priori information, or may be any other model with mask image generation capability, which is not limited in the solution of the present disclosure.

Figure 6A:
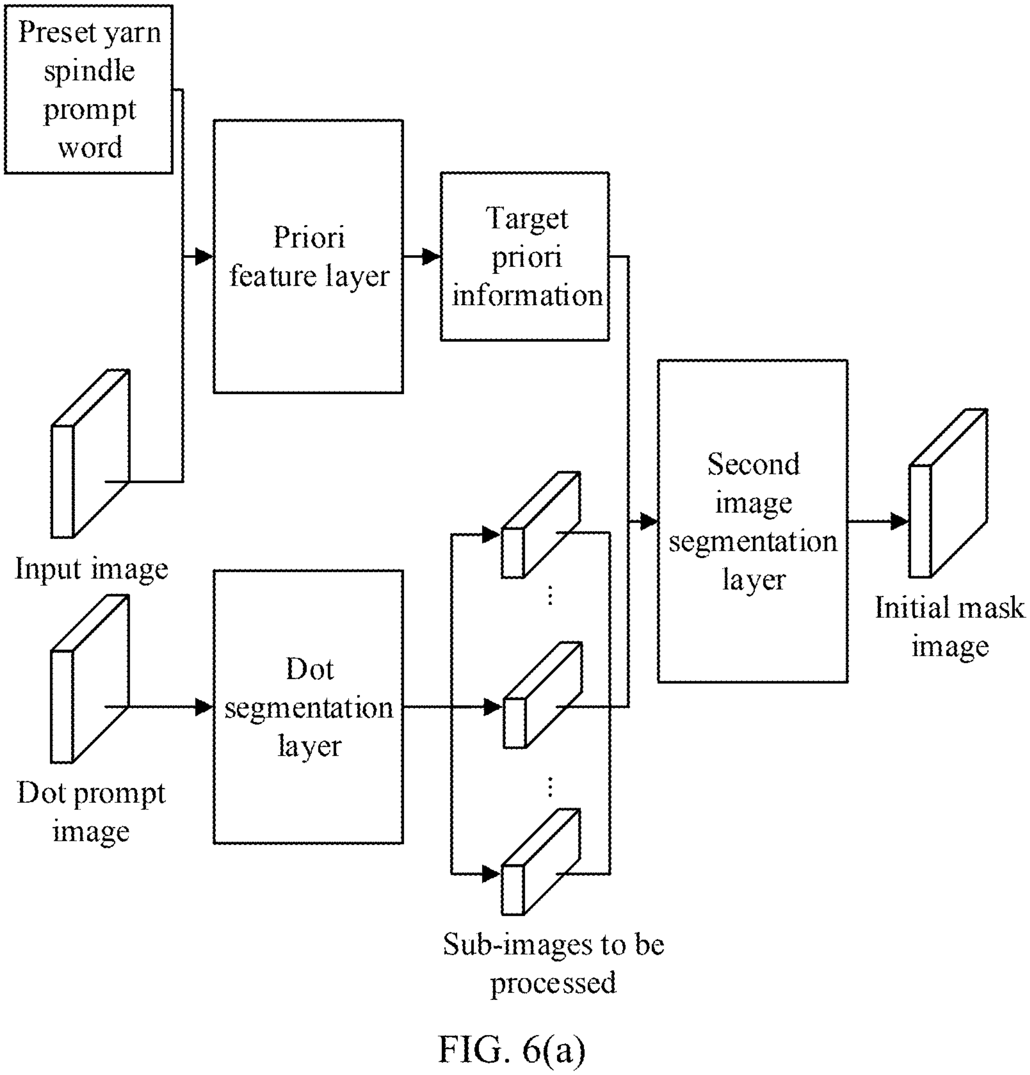
FIG. 6(*a*) is a schematic diagram of a model structure of a second target detection model according to an embodiment of the present application.
Figure 6B:
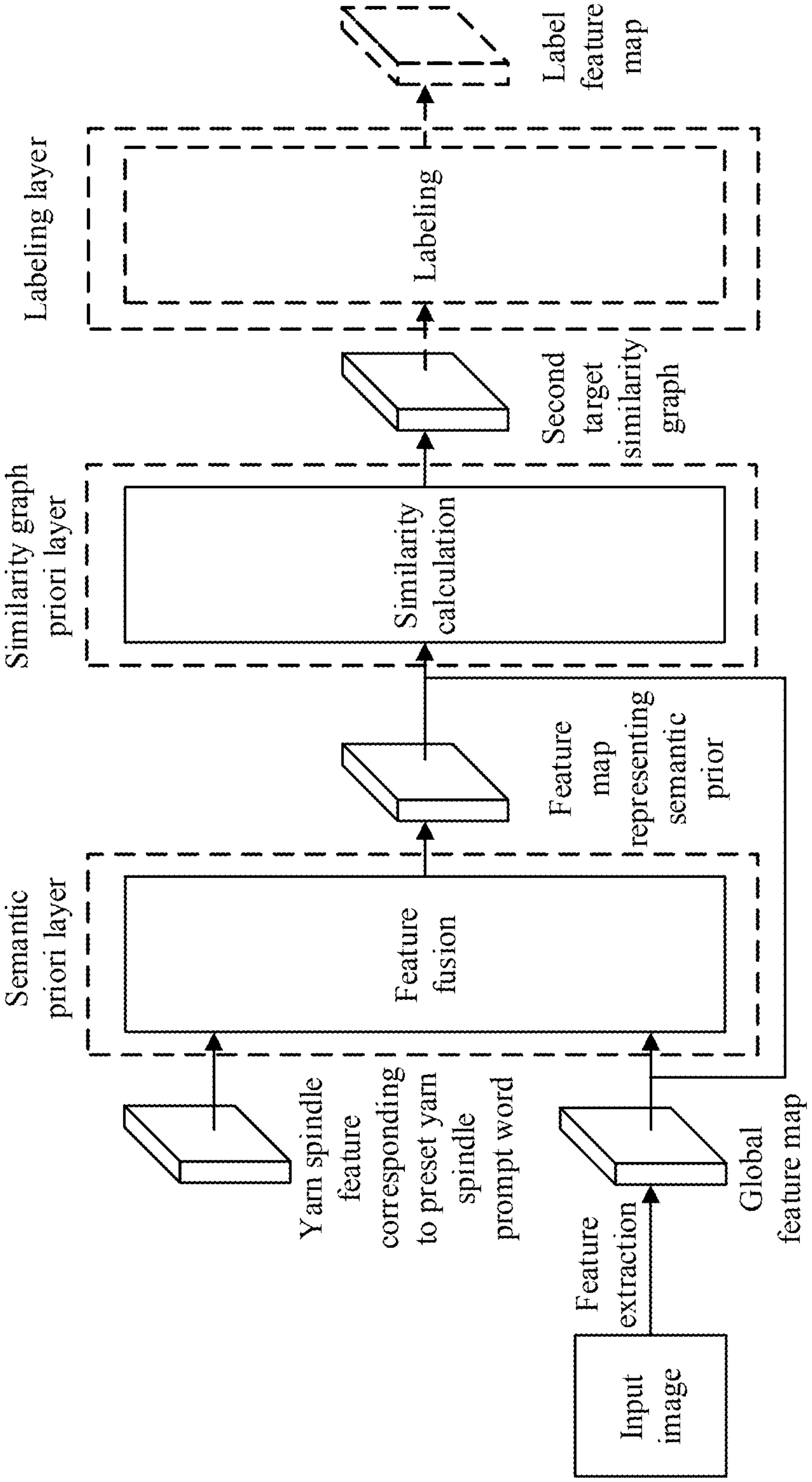
Figure 6C:
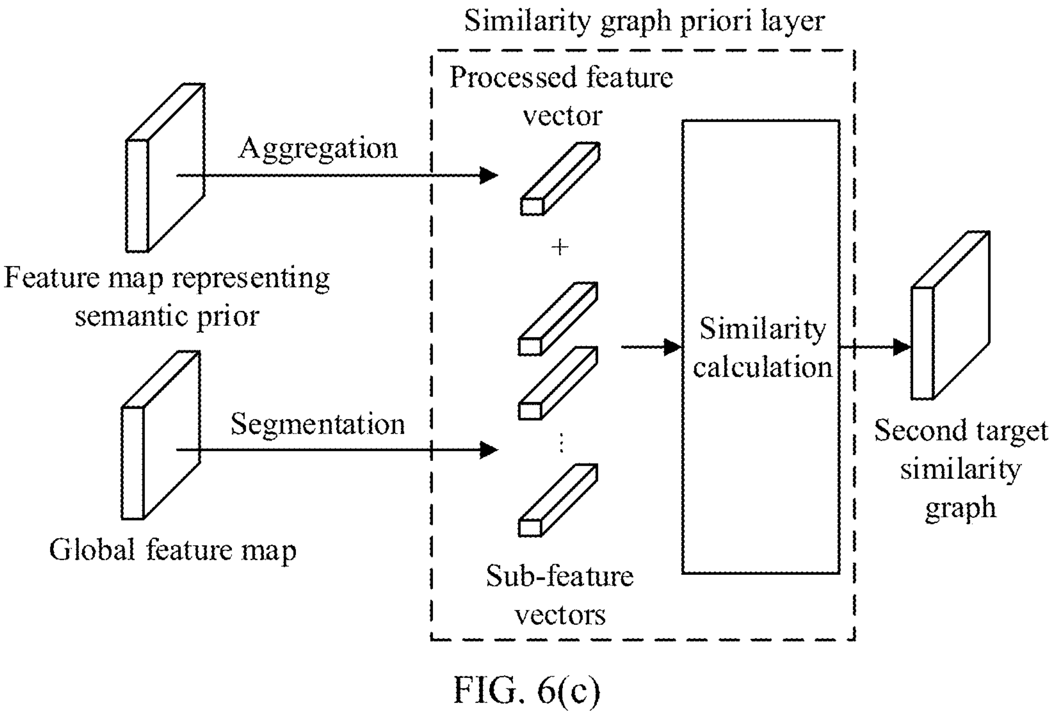

Further, in an example, as shown in FIG. 6(*a*), the second target detection model includes at least a priori feature layer, a second image segmentation layer and a dot segmentation layer.

Specifically, in an example, the priori feature layer is configured to obtain target priori information based on the preset yarn spindle prompt word and the input image; and the input image is the first entering image or the first leaving image. Here, the target priori information may be used to guide the second image segmentation layer to identify the yarn spindles and segment areas where the yarn spindles are located, so as to enhance the identification and segmentation capabilities of the second image segmentation layer, and then generate a mask.

Further, the dot segmentation layer is configured to obtain a plurality of sub-images to be processed of a dot prompt image, and the dot prompt image is obtained by processing the input image using dots.

Here, the relevant content of the dot segmentation layer can refer to the example description shown in FIG. 4(*b*), and will not be described again here.

Further, in yet another example, the second image segmentation layer is configured to identify yarn spindles in each sub-image to be processed based on the target priori information, and use a mask plate to mask an area where each yarn spindle is located in the sub-image to be processed to obtain a sub-mask image of each sub-image to be processed; and further, obtain an initial mask image of the input image based on the sub-mask image of each sub-image to be processed, for example, by splicing the sub-mask images of the sub-images to be processed, after obtaining the sub-mask image of each sub-image to be processed. Here, if the input image is the first entering image, the initial entering mask image can be obtained after processing in the above manner; and similarly, if the input image is the first leaving image, the initial leaving mask image can be obtained after processing in the above manner.

In this way, the solution of the present disclosure provides a specific model for obtaining a mask image. The model can utilize the target priori information to enhance the identification and segmentation capabilities of the second image segmentation layer, and at the same time, can also implement batch image processing based on the dot prompt image, thereby improving the segmentation efficiency, thus providing strong support for automatically and intelligently obtaining the detection information of the target trolley, and also providing strong support for improving the detection efficiency.

In a specific example of the solution of the present disclosure, the priori feature layer includes at least a semantic priori layer and a similarity graph priori layer.

Here, in an example, the semantic priori layer is configured to obtain a semantic priori feature based on at least the yarn spindle feature corresponding to the preset yarn spindle prompt word. For example, in an example, the yarn spindle feature corresponding to the preset yarn spindle prompt word may be directly used as the semantic priori feature.

Further, in another example, the semantic priori layer may also obtain the semantic priori feature in the following manner; and specifically, as shown in FIG. 6(*b*), the semantic priori layer is specifically configured to fuse the yarn spindle feature corresponding to the preset yarn spindle prompt word with the image feature of the input image (such as the global feature map of the input image) to obtain a feature map for representing semantic prior (i.e., the semantic priori feature). For example, the yarn spindle feature corresponding to the preset yarn spindle prompt word is multiplied element by element with the image feature of the input image to obtain the feature map for representing semantic prior.

It should be noted that, in the example, if the dimension of the yarn spindle feature corresponding to the preset yarn spindle prompt word is inconsistent with the dimension of the image feature of the input image, it is necessary to upsample (such as bilinear interpolation processing) the yarn spindle feature corresponding to the preset yarn spindle prompt word so that the dimension of the processed yarn spindle feature is the same as the dimension of the image feature of the input image, and then perform feature fusion on the two features. In this way, the feature information of the obtained semantic priori feature is more abundant, providing strong support for further enhancing the identification and segmentation capabilities of the second image segmentation layer.

Further, in yet another example, the similarity graph priori layer is configured to estimate an area where each yarn spindle is located in the input image based on a similarity between the yarn spindle feature corresponding to the preset yarn spindle prompt word and an image feature of the input image, to obtain a second target similarity graph.

Here, it should be noted that the target priori information mentioned above includes the semantic priori feature and the second target similarity graph.

Further, in an example, the similarity graph priori layer may determine the second target similarity graph in the following manner. Specifically, the similarity graph priori layer is specifically configured to: estimate the area where each yarn spindle is located in the input image based on the similarity between the obtained semantic priori feature and the image feature of the input image, to obtain the second target similarity graph; for example, as shown in FIG. 6(*b*) and FIG. 6(*c*), specifically configured to:

firstly, aggregate the obtained semantic priori features to obtain an aggregated semantic priori feature, for example, sum (or average, etc.) pixel values of feature vectors representing semantic priori features by column to obtain an aggregated feature vector; secondly, obtain a plurality of sub-feature vectors of the global feature map of the input image, for example, segment (such as divide by row) the feature vector representing the global feature map to obtain a plurality of sub-feature vectors in an example, where the dimension of each sub-feature vector obtained is the same as the dimension of the aggregated feature vector, thereby facilitating calculation of the similarity between them; and finally, obtain the similarity between each of the plurality of sub-feature vectors and the aggregated feature vector, and obtain the second target similarity graph based on the similarity.

In this way, the areas where the yarn spindles are located in the input image can be accurately determined, laying a foundation for subsequently identifying and separating the yarn spindles in the image accurately and obtaining the mask image.

Further, in an example, the priori feature layer may further include a feature enhancement layer. For example, the obtained second target similarity graph is input into the feature enhancement layer to perform feature enhancement on the second target similarity graph to obtain the second target similarity graph after feature enhancement. At this time, the second image segmentation layer may specifically perform identification and segmentation based on the semantic priori feature and the second target similarity graph after feature enhancement, thus further improving the accuracy of image identification and segmentation.

Alternatively, in another example, the priori feature layer may further include a labeling layer. For example, as shown in FIG. 6(*b*), the obtained second target similarity graph (or the second target similarity graph after feature enhancement) is input into the labeling layer to label the input second target similarity graph to obtain a label feature map; and at this time, the target priori information may specifically include the semantic priori feature and the label feature map.

Here, in the label feature map (for example, marked with "0" and "1"), if the value of an area is 1, the area is a positive area, that is, there is a yarn spindle or part of a yarn spindle; otherwise, the area is a negative area. In this way, it is convenient for the second image segmentation layer to focus on segmenting the positive area and ignore the negative area, thus further enhancing the identification and segmentation capabilities for yarn spindles, and then it is convenient to more accurately identify and separate the yarn spindles in the image while effectively improving the identification and segmentation efficiency.

Figure 7:
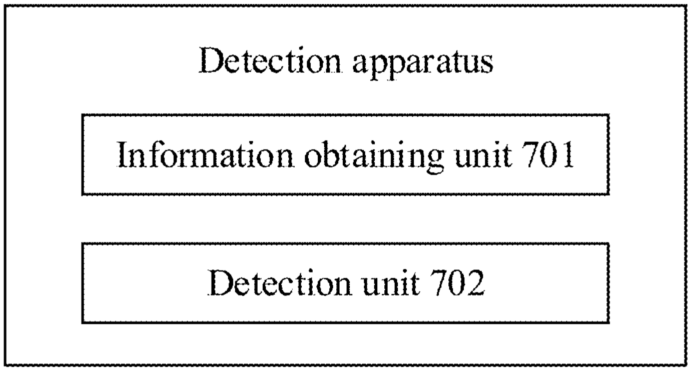
FIG. 7 is a structural schematic diagram of a detection apparatus according to an embodiment of the present application.

The solution of the present disclosure further provides a detection apparatus, applied to cloud. As shown in FIG. 7, the detection apparatus includes:

an information obtaining unit 701 configured to obtain a first entering image and a first leaving image when detecting that a target trolley leaves a target area; where the first entering image is obtained by performing image acquisition on the target trolley after the target trolley enters the target area, the first leaving image is obtained by performing image acquisition on the target trolley after the target trolley leaves the target area, and both the first entering image and the first leaving image contain all yarn spindles carried by the target trolley; and a detection unit 702 configured to input the first entering image into a first target detection model to obtain a first quantity of yarn spindles contained in the first entering image, and input the first leaving image into the first target detection model to obtain a second quantity of yarn spindles contained in the first leaving image; where the first target detection model is used to identify yarn spindles in an input image based on a preset yarn spindle prompt word, and estimate an actual quantity of yarn spindles in the input image based on an identification result; and generate detection information for the target trolley based on the first quantity of yarn spindles contained in the first entering image and the second quantity of yarn spindles contained in the first leaving image.

In a specific example of the solution of the present disclosure, the first target detection model includes at least a similarity graph feature layer, a dot segmentation layer, a first image segmentation layer and a data statistics layer;

the similarity graph feature layer is configured to estimate a position of each yarn spindle in the input image based on a similarity between a yarn spindle feature corresponding to the preset yarn spindle prompt word and an image feature of the input image, to obtain a first target similarity graph;

the dot segmentation layer is configured to segment a dot prompt image to obtain a plurality of sub-images to be processed indicating positions of dots; where positions of dots in different sub-images to be processed among the plurality of sub-images to be processed do not overlap, and the dot prompt image is obtained by processing the input image using dots;

the first image segmentation layer is configured to identify yarn spindles in each sub-image to be processed based on the preset yarn spindle prompt word, and use a mask plate to mask an area where each yarn spindle is located in the sub-image to be processed to obtain a sub-mask image of each sub-image to be processed; and obtain a mask image of the input image based on the sub-mask image of each sub-image to be processed; and the data statistics layer is configured to estimate the actual quantity of yarn spindles in the input image based on the first target similarity graph and the mask image of the input image.

In a specific example of the solution of the present disclosure, the data statistics layer is specifically configured to:

calculate a similarity between an image feature corresponding to a mask area in the mask image of the input image and an image feature at an area in the first target similarity graph corresponding to the mask area to obtain a similarity corresponding to the mask area; where the mask area is an area where the mask plate is located in the mask image of the input image; and estimate the actual quantity of yarn spindles in the input image based on the similarity corresponding to the mask area.

In a specific example of the solution of the present disclosure, the detection unit is specifically configured to:

obtain a target entering mask image of the first entering image and a target leaving mask image of the first leaving image when the first quantity of yarn spindles contained in the first entering image is different from the second quantity of yarn spindles contained in the first leaving image; where the target entering mask image is at least an image obtained by using a mask plate to mask an area where each yarn spindle is located in the first entering image, and the target leaving mask image is at least an image obtained by using a mask plate to mask an area where each yarn spindle is located in the first leaving image; and generate the detection information for the target trolley based on difference information between the target entering mask image and the target leaving mask image.

In a specific example of the solution of the present disclosure, the detection unit is specifically configured to:

input the first entering image into a second target detection model to obtain an initial entering mask image of the first entering image; where the second target detection model is able to identify an area where each yarn spindle is located in an input image based on the preset yarn spindle prompt word, and use a mask plate to mask the area where each yarn spindle is located in the image to obtain a masked image; and the quantity of mask plates contained in the initial entering mask image of the first entering image is same as the quantity of yarn spindles actually contained in the first entering image;

obtain identification information of yarn spindles to be carried at carrying positions of the target trolley based on identification information of the target trolley; and map the identification information of the yarn spindles to be carried at the carrying positions of the target trolley onto the mask plates at different positions in the initial entering mask image to obtain the target entering mask image corresponding to the first entering image and having the identification information of the yarn spindles, where the target entering mask image corresponding to the first entering image and having the identification information of the yarn spindles is able to represent identification information of the yarn spindles actually contained in the first entering image.

In a specific example of the solution of the present disclosure, the detection unit is specifically configured to:

input the first leaving image into the second target detection model to obtain an initial leaving mask image of the first leaving image; where the quantity of mask plates contained in the initial leaving mask image of the first leaving image is same as the quantity of yarn spindles actually contained in the first leaving image; and map the identification information of the yarn spindles to be carried at the carrying positions of the target trolley onto the mask plates at different positions in the initial leaving mask image to obtain the target leaving mask image corresponding to the first leaving image and having the identification information of the yarn spindles, where the target leaving mask image corresponding to the first leaving image and having the identification information of the yarn spindles is able to represent identification information of the yarn spindles actually contained in the first leaving image.

In a specific example of the solution of the present disclosure, the detection unit is specifically configured to:

compare the target entering mask image corresponding to the first entering image and having the identification information of the yarn spindles with the target leaving mask image corresponding to the first leaving image and having the identification information of the yarn spindles, to determine a missing yarn spindle; and obtain the detection information of the target trolley based on a comparison result.

In a specific example of the solution of the present disclosure, the second target detection model includes at least a priori feature layer, a second image segmentation layer and the dot segmentation layer;

the priori feature layer is configured to obtain target priori information based on the preset yarn spindle prompt word and the input image; and the second image segmentation layer is configured to identify yarn spindles in each sub-image to be processed based on the target priori information, and use a mask plate to mask an area where each yarn spindle is located in the sub-image to be processed to obtain a sub-mask image of each sub-image to be processed; and obtain an initial mask image of the input image based on the sub-mask image of each sub-image to be processed, where the initial mask image is an initial entering mask image or initial leaving mask image.

In a specific example of the solution of the present disclosure, the priori feature layer includes at least a semantic priori layer and a similarity graph priori layer;

the semantic priori layer is configured to obtain a semantic priori feature based on at least the yarn spindle feature corresponding to the preset yarn spindle prompt word; and the similarity graph priori layer is configured to estimate an area where each yarn spindle is located in the input image based on a similarity between the yarn spindle feature corresponding to the preset yarn spindle prompt word and an image feature of the input image, to obtain a second target similarity graph;

where the target priori information includes the semantic priori feature and the second target similarity graph.

In a specific example of the solution of the present disclosure, the semantic priori layer is specifically configured to fuse the yarn spindle feature corresponding to the preset yarn spindle prompt word with the image feature of the input image to obtain the semantic priori feature.

In a specific example of the solution of the present disclosure, the similarity graph priori layer is specifically configured to:

estimate the area where each yarn spindle is located in the input image based on a similarity between the obtained semantic priori feature and the image feature of the input image, to obtain the second target similarity graph.

For the description of specific functions and examples of the units of the apparatus of the embodiment of the present disclosure, reference may be made to the relevant description of the corresponding steps in the above method embodiments, and details are not repeated here.

In the technical solution of the present disclosure, the acquisition, storage and application of the user's personal information involved are in compliance with relevant laws and regulations, and do not violate public order and good customs.

Figure 8:
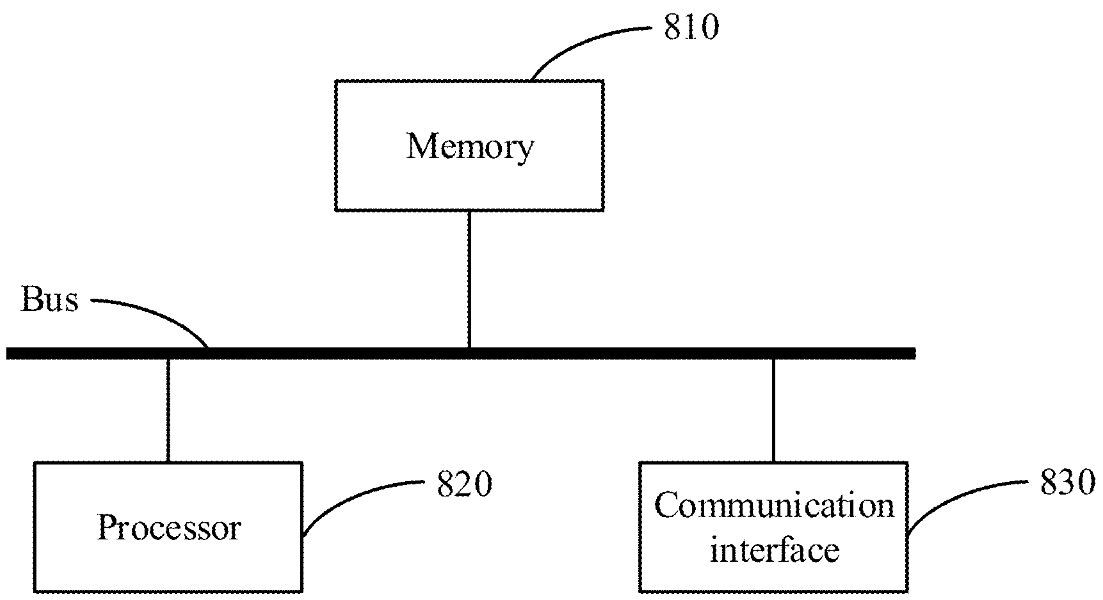
FIG. 8 is a block diagram of an electronic device for implementing the detection method of the embodiment of the present disclosure.

FIG. 8 is a structural block diagram of an electronic device according to an embodiment of the present disclosure. As shown in FIG. 8, the electronic device includes: a memory 810 and a processor 820, and the memory 810 stores a computer program that can run on the processor 820. There may be one or more memories 810 and processors 820. The memory 810 may store one or more computer programs, and the one or more computer programs cause the electronic device to perform the method provided in the above method embodiment, when executed by the electronic device. The electronic device may also include: a communication interface 830 configured to communicate with an external device for data interactive transmission.

If the memory 810, the processor 820 and the communication interface 830 are implemented independently, the memory 810, the processor 820 and the communication interface 830 may be connected to each other and complete communication with each other via a bus. The bus may be an Industry Standard Architecture (ISA) bus, a Peripheral Component Interconnect (PCI) bus, or an Extended Industry Standard Architecture (EISA) bus, etc. The bus may be divided into an address bus, a data bus, and/or a control bus, etc. For ease of representation, the bus is represented by only one thick line in FIG. 8, but this thick line does not represent only one bus or only one type of bus.

Optionally, in a specific implementation, if the memory 810, the processor 820 and the communication interface 830 are integrated on one chip, the memory 810, the processor 820 and the communication interface 830 may communicate with each other via an internal interface.

It should be understood that the above processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, and/or a discrete hardware component, etc. The general-purpose processor may be a microprocessor or any conventional processor, etc. It is worth noting that the processor may be a processor that supports the Advanced RISC Machines (ARM) architecture.

Further, optionally, the above memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Rate SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, and/or microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the quantity of technical features indicated. Therefore, a feature defined with "first" or "second" may explicitly or implicitly include one or more such features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A detection method comprising:

obtaining a first entering image and a first leaving image after detecting that a target trolley leaves a target area; wherein the first entering image is obtained by performing image acquisition on the target trolley after detecting that the target trolley enters the target area, the first leaving image is obtained by performing image acquisition on the target trolley after detecting that the target trolley leaves the target area, and both the first entering image and the first leaving image contain all yarn spindles carried by the target trolley;

inputting the first entering image into a first target detection model to obtain a first quantity of yarn spindles contained in the first entering image, and inputting the first leaving image into the first target detection model to obtain a second quantity of yarn spindles contained in the first leaving image; wherein the first target detection model is used to identify yarn spindles in an input image based on a preset yarn spindle prompt word, and estimate an actual quantity of yarn spindles in the input image based on an identification result; and generating detection information for the target trolley based on the first quantity of yarn spindles contained in the first entering image and the second quantity of yarn spindles contained in the first leaving image;

wherein the first target detection model comprises at least a similarity graph feature layer, a dot segmentation layer, a first image segmentation layer and a data statistics layer;

the similarity graph feature layer is configured to estimate a position of each yarn spindle in the input image based on a similarity between a yarn spindle feature corresponding to the preset yarn spindle prompt word and an image feature of the input image, to obtain a first target similarity graph;

the dot segmentation layer is configured to segment a dot prompt image to obtain a plurality of sub-images to be processed indicating positions of dots; wherein positions of dots in different sub-images to be processed among the plurality of sub-images to be processed do not overlap, and the dot prompt image is obtained by processing the input image using dots;

the first image segmentation layer is configured to identify yarn spindles in each sub-image to be processed based on the preset yarn spindle prompt word, and use a mask plate to mask an area where each yarn spindle is located in the sub-image to be processed to obtain a sub-mask image of each sub-image to be processed; and obtain a mask image of the input image based on the sub-mask image of each sub-image to be processed; and the data statistics layer is configured to estimate the actual quantity of yarn spindles in the input image based on the first target similarity graph and the mask image of the input image.

2. The method of claim 1, wherein the data statistics layer is specifically configured to:

calculate a similarity between an image feature corresponding to a mask area in the mask image of the input image and an image feature at an area in the first target similarity graph corresponding to the mask area to obtain a similarity corresponding to the mask area; wherein the mask area is an area where the mask plate is located in the mask image of the input image; and estimate the actual quantity of yarn spindles in the input image based on the similarity corresponding to the mask area.

3. The method of claim 1, wherein generating the detection information for the target trolley based on the first quantity of yarn spindles contained in the first entering image and the second quantity of yarn spindles contained in the first leaving image, comprises:

obtaining a target entering mask image of the first entering image and a target leaving mask image of the first leaving image in a case of the first quantity of yarn spindles contained in the first entering image is different from the second quantity of yarn spindles contained in the first leaving image; wherein the target entering mask image is at least an image obtained by using a mask plate to mask an area where each yarn spindle is located in the first entering image, and the target leaving mask image is at least an image obtained by using a mask plate to mask an area where each yarn spindle is located in the first leaving image; and generating the detection information for the target trolley based on difference information between the target entering mask image and the target leaving mask image.

4. The method of claim 3, wherein obtaining the target entering mask image of the first entering image, comprises:

inputting the first entering image into a second target detection model to obtain an initial entering mask image of the first entering image; wherein the second target detection model is able to identify an area where each yarn spindle is located in an input image based on the preset yarn spindle prompt word, and use a mask plate to mask the area where each yarn spindle is located in the input image to obtain a masked image; and the quantity of mask plates contained in the initial entering mask image of the first entering image is same as the quantity of yarn spindles actually contained in the first entering image;

obtaining identification information of yarn spindles to be carried at carrying positions of the target trolley based on identification information of the target trolley; and mapping the identification information of the yarn spindles to be carried at the carrying positions of the target trolley onto the mask plates at different positions in the initial entering mask image to obtain the target entering mask image corresponding to the first entering image and having the identification information of the yarn spindles, wherein the target entering mask image corresponding to the first entering image and having the identification information of the yarn spindles is able to represent identification information of the yarn spindles actually contained in the first entering image.

5. The method of claim 4, wherein obtaining the target leaving mask image of the first leaving image, comprises:

inputting the first leaving image into the second target detection model to obtain an initial leaving mask image of the first leaving image; wherein the quantity of mask plates contained in the initial leaving mask image of the first leaving image is same as the quantity of yarn spindles actually contained in the first leaving image; and mapping the identification information of the yarn spindles to be carried at the carrying positions of the target trolley onto the mask plates at different positions in the initial leaving mask image to obtain the target leaving mask image corresponding to the first leaving image and having the identification information of the yarn spindles, wherein the target leaving mask image corresponding to the first leaving image and having the identification information of the yarn spindles is able to represent identification information of the yarn spindles actually contained in the first leaving image.

6. The method of claim 5, wherein obtaining the detection information of the target trolley based on the difference information between the target entering mask image and the target leaving mask image, comprises:

comparing the target entering mask image corresponding to the first entering image and having the identification information of the yarn spindles with the target leaving mask image corresponding to the first leaving image and having the identification information of the yarn spindles, to determine a missing yarn spindle; and obtaining the detection information of the target trolley based on a comparison result.

7. The method of claim 4, wherein the second target detection model comprises at least a priori feature layer, a second image segmentation layer and the dot segmentation layer;

the priori feature layer is configured to obtain target priori information based on the preset yarn spindle prompt word and the input image; and the second image segmentation layer is configured to identify yarn spindles in each sub-image to be processed based on the target priori information, and use a mask plate to mask an area where each yarn spindle is located in the sub-image to be processed to obtain a sub-mask image of each sub-image to be processed; and obtain an initial mask image of the input image based on the sub-mask image of each sub-image to be processed, wherein the initial mask image is an initial entering mask image or initial leaving mask image.

8. The method of claim 7, wherein the priori feature layer comprises at least a semantic priori layer and a similarity graph priori layer;

the semantic priori layer is configured to obtain a semantic priori feature based on at least the yarn spindle feature corresponding to the preset yarn spindle prompt word; and the similarity graph priori layer is configured to estimate an area where each yarn spindle is located in the input image based on a similarity between the yarn spindle feature corresponding to the preset yarn spindle prompt word and an image feature of the input image, to obtain a second target similarity graph;

wherein the target priori information comprises the semantic priori feature and the second target similarity graph.

9. The method of claim 8, wherein the semantic priori layer is specifically configured to fuse the yarn spindle feature corresponding to the preset yarn spindle prompt word with the image feature of the input image to obtain the semantic priori feature.

10. The method of claim 8, wherein the similarity graph priori layer is specifically configured to:

estimate the area where each yarn spindle is located in the input image based on a similarity between the obtained semantic priori feature and the image feature of the input image, to obtain the second target similarity graph.

11. An electronic device, comprising:

at least one processor; and a memory connected in communication with the at least one processor;

wherein the memory stores an instruction executable by the at least one processor, and the instruction, when executed by the at least one processor, enables the at least one processor to execute:

obtaining a first entering image and a first leaving image after detecting that a target trolley leaves a target area; wherein the first entering image is obtained by performing image acquisition on the target trolley after detecting that the target trolley enters the target area, the first leaving image is obtained by performing image acquisition on the target trolley after detecting that the target trolley leaves the target area, and both the first entering image and the first leaving image contain all yarn spindles carried by the target trolley;

inputting the first entering image into a first target detection model to obtain a first quantity of yarn spindles contained in the first entering image, and inputting the first leaving image into the first target detection model to obtain a second quantity of yarn spindles contained in the first leaving image; wherein the first target detection model is used to identify yarn spindles in an input image based on a preset yarn spindle prompt word, and estimate an actual quantity of yarn spindles in the input image based on an identification result; and generating detection information for the target trolley based on the first quantity of yarn spindles contained in the first entering image and the second quantity of yarn spindles contained in the first leaving image;

wherein the first target detection model comprises at least a similarity graph feature layer, a dot segmentation layer, a first image segmentation layer and a data statistics layer;

the similarity graph feature layer is configured to estimate a position of each yarn spindle in the input image based on a similarity between a yarn spindle feature corresponding to the preset yarn spindle prompt word and an image feature of the input image, to obtain a first target similarity graph;

the dot segmentation layer is configured to segment a dot prompt image to obtain a plurality of sub-images to be processed indicating positions of dots; wherein positions of dots in different sub-images to be processed among the plurality of sub-images to be processed do not overlap, and the dot prompt image is obtained by processing the input image using dots;

the first image segmentation layer is configured to identify yarn spindles in each sub-image to be processed based on the preset yarn spindle prompt word, and use a mask plate to mask an area where each yarn spindle is located in the sub-image to be processed to obtain a sub-mask image of each sub-image to be processed; and obtain a mask image of the input image based on the sub-mask image of each sub-image to be processed; and the data statistics layer is configured to estimate the actual quantity of yarn spindles in the input image based on the first target similarity graph and the mask image of the input image.

12. The electronic device of claim 11, wherein the data statistics layer is specifically configured to:

calculate a similarity between an image feature corresponding to a mask area in the mask image of the input image and an image feature at an area in the first target similarity graph corresponding to the mask area to obtain a similarity corresponding to the mask area; wherein the mask area is an area where the mask plate is located in the mask image of the input image; and estimate the actual quantity of yarn spindles in the input image based on the similarity corresponding to the mask area.

13. The electronic device of claim 11, wherein the instruction, when executed by the at least one processor, enables the at least one processor to execute generating the detection information for the target trolley based on the first quantity of yarn spindles contained in the first entering image and the second quantity of yarn spindles contained in the first leaving image, by:

obtaining a target entering mask image of the first entering image and a target leaving mask image of the first leaving image in a case of the first quantity of yarn spindles contained in the first entering image is different from the second quantity of yarn spindles contained in the first leaving image; wherein the target entering mask image is at least an image obtained by using a mask plate to mask an area where each yarn spindle is located in the first entering image, and the target leaving mask image is at least an image obtained by using a mask plate to mask an area where each yarn spindle is located in the first leaving image; and generating the detection information for the target trolley based on difference information between the target entering mask image and the target leaving mask image.

14. The electronic device of claim 13, wherein the instruction, when executed by the at least one processor, enables the at least one processor to execute obtaining the target entering mask image of the first entering image, by:

inputting the first entering image into a second target detection model to obtain an initial entering mask image of the first entering image; wherein the second target detection model is able to identify an area where each yarn spindle is located in an input image based on the preset yarn spindle prompt word, and use a mask plate to mask the area where each yarn spindle is located in the input image to obtain a masked image; and the quantity of mask plates contained in the initial entering mask image of the first entering image is same as the quantity of yarn spindles actually contained in the first entering image;

obtaining identification information of yarn spindles to be carried at carrying positions of the target trolley based on identification information of the target trolley; and mapping the identification information of the yarn spindles to be carried at the carrying positions of the target trolley onto the mask plates at different positions in the initial entering mask image to obtain the target entering mask image corresponding to the first entering image and having the identification information of the yarn spindles, wherein the target entering mask image corresponding to the first entering image and having the identification information of the yarn spindles is able to represent identification information of the yarn spindles actually contained in the first entering image.

15. A non-transitory computer-readable storage medium storing a computer instruction thereon, wherein the computer instruction is used to cause a computer to execute:

obtaining a first entering image and a first leaving image after detecting that a target trolley leaves a target area; wherein the first entering image is obtained by performing image acquisition on the target trolley after detecting that the target trolley enters the target area, the first leaving image is obtained by performing image acquisition on the target trolley after detecting that the target trolley leaves the target area, and both the first entering image and the first leaving image contain all yarn spindles carried by the target trolley;

inputting the first entering image into a first target detection model to obtain a first quantity of yarn spindles contained in the first entering image, and inputting the first leaving image into the first target detection model to obtain a second quantity of yarn spindles contained in the first leaving image; wherein the first target detection model is used to identify yarn spindles in an input image based on a preset yarn spindle prompt word, and estimate an actual quantity of yarn spindles in the input image based on an identification result; and generating detection information for the target trolley based on the first quantity of yarn spindles contained in the first entering image and the second quantity of yarn spindles contained in the first leaving image;

wherein the first target detection model comprises at least a similarity graph feature layer, a dot segmentation layer, a first image segmentation layer and a data statistics layer;

the similarity graph feature layer is configured to estimate a position of each yarn spindle in the input image based on a similarity between a yarn spindle feature corresponding to the preset yarn spindle prompt word and an image feature of the input image, to obtain a first target similarity graph;

the dot segmentation layer is configured to segment a dot prompt image to obtain a plurality of sub-images to be processed indicating positions of dots; wherein positions of dots in different sub-images to be processed among the plurality of sub-images to be processed do not overlap, and the dot prompt image is obtained by processing the input image using dots;

the first image segmentation layer is configured to identify yarn spindles in each sub-image to be processed based on the preset yarn spindle prompt word, and use a mask plate to mask an area where each yarn spindle is located in the sub-image to be processed to obtain a sub-mask image of each sub-image to be processed; and obtain a mask image of the input image based on the sub-mask image of each sub-image to be processed; and the data statistics layer is configured to estimate the actual quantity of yarn spindles in the input image based on the first target similarity graph and the mask image of the input image.

16. The non-transitory computer-readable storage medium of claim 15, wherein the data statistics layer is specifically configured to:

calculate a similarity between an image feature corresponding to a mask area in the mask image of the input image and an image feature at an area in the first target similarity graph corresponding to the mask area to obtain a similarity corresponding to the mask area; wherein the mask area is an area where the mask plate is located in the mask image of the input image; and estimate the actual quantity of yarn spindles in the input image based on the similarity corresponding to the mask area.

17. The non-transitory computer-readable storage medium of claim 15, wherein the computer instruction is used to cause the computer to execute generating the detection information for the target trolley based on the first quantity of yarn spindles contained in the first entering image and the second quantity of yarn spindles contained in the first leaving image, by:

obtaining a target entering mask image of the first entering image and a target leaving mask image of the first leaving image in a case of the first quantity of yarn spindles contained in the first entering image is different from the second quantity of yarn spindles contained in the first leaving image; wherein the target entering mask image is at least an image obtained by using a mask plate to mask an area where each yarn spindle is located in the first entering image, and the target leaving mask image is at least an image obtained by using a mask plate to mask an area where each yarn spindle is located in the first leaving image; and generating the detection information for the target trolley based on difference information between the target entering mask image and the target leaving mask image.

* * * * *